United States Patent
Panchbhai et al.

(10) Patent No.: US 9,991,836 B2
(45) Date of Patent: Jun. 5, 2018

(54) SYSTEMS AND METHODS FOR IDENTIFYING END STOPS IN A LINEAR MOTOR

(71) Applicants: Saylee P. Panchbhai, Houston, TX (US); Nathan A. Etter, Broken Arrow, OK (US); Evan G. Mackay, Tulsa, OK (US)

(72) Inventors: Saylee P. Panchbhai, Houston, TX (US); Nathan A. Etter, Broken Arrow, OK (US); Evan G. Mackay, Tulsa, OK (US)

(73) Assignee: Baker Hughes Incorporated, Houston, TX (US)

(*) Notice: Subject to any disclaimer, the term of this patent is extended or adjusted under 35 U.S.C. 154(b) by 0 days. days.

(21) Appl. No.: 15/294,105

(22) Filed: Oct. 14, 2016

(65) Prior Publication Data

US 2017/0111001 A1    Apr. 20, 2017

Related U.S. Application Data

(60) Provisional application No. 62/242,665, filed on Oct. 16, 2015.

(51) Int. Cl.
*H02P 25/06* (2016.01)
*H02K 11/21* (2016.01)
*H02K 11/30* (2016.01)
*H02K 5/132* (2006.01)
*H02K 41/02* (2006.01)
*H02K 41/03* (2006.01)

(Continued)

(52) U.S. Cl.
CPC ............. *H02P 25/06* (2013.01); *H02K 5/132* (2013.01); *H02K 11/21* (2016.01); *H02K 11/30* (2016.01); *H02K 41/02* (2013.01); *H02K 41/031* (2013.01); *E21B 43/128* (2013.01); *H02K 11/215* (2016.01)

(58) Field of Classification Search
CPC ....... E21B 43/128; E21B 43/12; H02K 11/21; H02K 11/215; H02K 41/02; H02K 41/031; H02K 5/132; H02P 25/06
See application file for complete search history.

(56) References Cited

U.S. PATENT DOCUMENTS

| | | | | |
|---|---|---|---|---|
| 5,281,100 | A * | 1/1994 | Diederich | E21B 43/127 417/18 |
| 5,503,174 | A * | 4/1996 | Schulze | F16K 31/061 137/1 |

(Continued)

*Primary Examiner* — Shawki S Ismail
*Assistant Examiner* — Muhammad S Islam
(74) *Attorney, Agent, or Firm* — Law Offices of Mark L. Berrier

(57) ABSTRACT

Systems and methods for operating linear motors, and for determining whether a linear motor has reached the end of its power and return strokes. In one embodiment, an electric drive controller of an ESP system monitors position signals received from the system's linear motor and determines transition time differentials, transition counts from the beginning of a stroke, elapsed stroke times and related parameters. If predetermined conditions relating to these parameters are met, the controller determines that the linear motor's mover has reached the end of its stroke. The controller therefore reverses the phase order of the drive's output power and thereby reverses the direction of the mover.

16 Claims, 5 Drawing Sheets

(51) Int. Cl.
*E21B 43/12* (2006.01)
*H02K 11/215* (2016.01)

(56) References Cited

U.S. PATENT DOCUMENTS

| | | | |
|---|---|---|---|
| 6,937,923 B1 * | 8/2005 | Bassett | E21B 34/16 137/2 |
| 8,851,860 B1 * | 10/2014 | Mail | F04B 47/02 166/105 |
| 2015/0252667 A1 * | 9/2015 | Chronister | E21B 43/12 702/12 |

* cited by examiner

SYSTEMS AND METHODS FOR IDENTIFYING END STOPS IN A LINEAR MOTOR

CROSS-REFERENCE TO RELATED APPLICATIONS

This application claims the benefit of U.S. Provisional Patent Application 62/242,665, filed Oct. 3, 2016 by Saylee P. Panchbhai, et al., which is incorporated by reference as if set forth herein in its entirety.

BACKGROUND

Field of the Invention

The invention relates generally to the operation of linear motors, and more particularly to means for determining whether a linear motor has reached an end stop at the end of a power or return stroke.

Related Art

In the production of oil from wells, it is often necessary to use an artificial lift system to maintain the flow of oil. The artificial lift system commonly includes an electric submersible pump (ESP) that is positioned downhole in a producing region of the well. The ESP has a motor that receives electrical signals from equipment at the surface of the well. The received signals run the motor, which in turn drives a pump to lift the oil out of the well.

ESP motors commonly use rotary designs in which a rotor is coaxially positioned within a stator and rotates within the stator. The shaft of the rotor is coupled to a pump, and drives a shaft of the pump to turn impellers within the body of the pump. The impellers force the oil through the pump and out of the well. While rotary motors are typically used to enhance oil recovery, it is also possible to use linear motors for the same purpose. Instead of a rotor, the linear motor has a mover that moves in a linear, reciprocating motion. The mover drives a plunger-type pump to force oil out of the well, thus enhancing production.

In order to properly control a linear motor, it is desirable to know the position of the mover within the stator. Linear motors may use a variety of sensors (e.g., Hall-effect sensors) to determine the position of the mover. The signals from these sensors (which may be referred to herein as the Hall signals) are provided, as a feedback signal, to the control system. This control system then produces a drive signal to move the motor in the power or the return stroke. The speed of the motor is controlled by increasing or decreasing the voltage level of the drive signal.

It would be desirable to provide means to determine whether the mover of a linear motor has stalled or stopped (e.g., when the motor's mover has reached an end stop), so that the mover may be moved in a controlled fashion in either direction.

SUMMARY OF THE INVENTION

The present disclosure describes systems and methods for operating linear motors, and for determining whether a linear motor has reached the end of its power and return strokes. One embodiment is a method for controlling a linear motor of an electric submersible pump (ESP) system. In this method, power is initially provided to a linear motor of an ESP system, where the power has a first phase order that drives the mover of the motor in a first direction. A set of position sensors in the motor's stator are monitored. Transitions in the output signals indicate changes in the position of the motor's mover. The end of the motor's power and/or return strokes may be identified by several different tests. For example, Time differentials between successive transitions in the output signals are identified, and a count of the transitions is maintained. When the time differential between the last pair of successive transitions exceeds a threshold differential and the count of the transitions at least a minimum count, the power provided to the linear motor is reversed by providing power having a second phase order which is opposite the first phase order. In another test, it is determined whether the count of the transitions in the output signals exceeds a maximum count threshold and, if this is true, the power provided to the linear motor is reversed. Another test determines whether an output voltage of the power provided to the linear motor exceeds a threshold voltage and, if so, the power to the motor is reversed. In another test, it is determined whether the linear motor is performing a priming routine. If so, it is determined whether the count of the transitions in the output signals is within a predetermined range of a maximum count threshold. If this is also true, the power provided to the linear motor is reversed. In yet another test, an elapsed time for the stroke is maintained and, when the elapsed time for the stroke exceeds a threshold, the power to the linear motor is reversed. In another test, it is determined whether the linear motor is performing a return stroke, if so, it is determined whether the motor's mover has moved beyond a bottom spring in the stator. If this is the case, the power to the motor is reversed. In another test, it is determined whether the linear motor is performing a power stroke. If so, it is determined whether the count of the transitions in the output signals is within a predetermined range of a maximum count threshold. If the count is within the predetermined range of the maximum, The power provided to the linear motor is reversed.

An alternative embodiment comprises an apparatus. In this embodiment, the apparatus may include an electric drive that is configured to produce output power, such as may be suitable to drive a linear motor, where the output power initially has a first phase order. The electric drive includes a controller that receives motor position signals. The controller monitors the position signals, determines time differentials between successive ones of transitions in the position signals, and maintains a count of the transitions in the position signals. When the time differential between a last pair of successive transitions in the output signals exceeds a threshold differential, and there have been at least a minimum count of transitions in the signals, the controller reverses the phase order of output power. The electric drive may be implemented in an ESP system. In this system, the electric drive is coupled by a cable to a linear motor, which is in turn coupled to drive a reciprocating pump. The linear motor has a stator and a mover, where the mover is positioned within a bore of the stator and moves in a reciprocating motion within the bore. The movement of the mover between the ends of the stator is the stroke of the motor. The linear motor has a set of position sensors in the stator, proximate to the bore to sense movement of the mover. The position sensors produce position signals in which transitions indicate changes in the position of the mover. The ESP system's electric drive uses the tests noted above to determine whether the mover has reached the end it its stroke and reverses the output power to reverse the direction of the mover.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
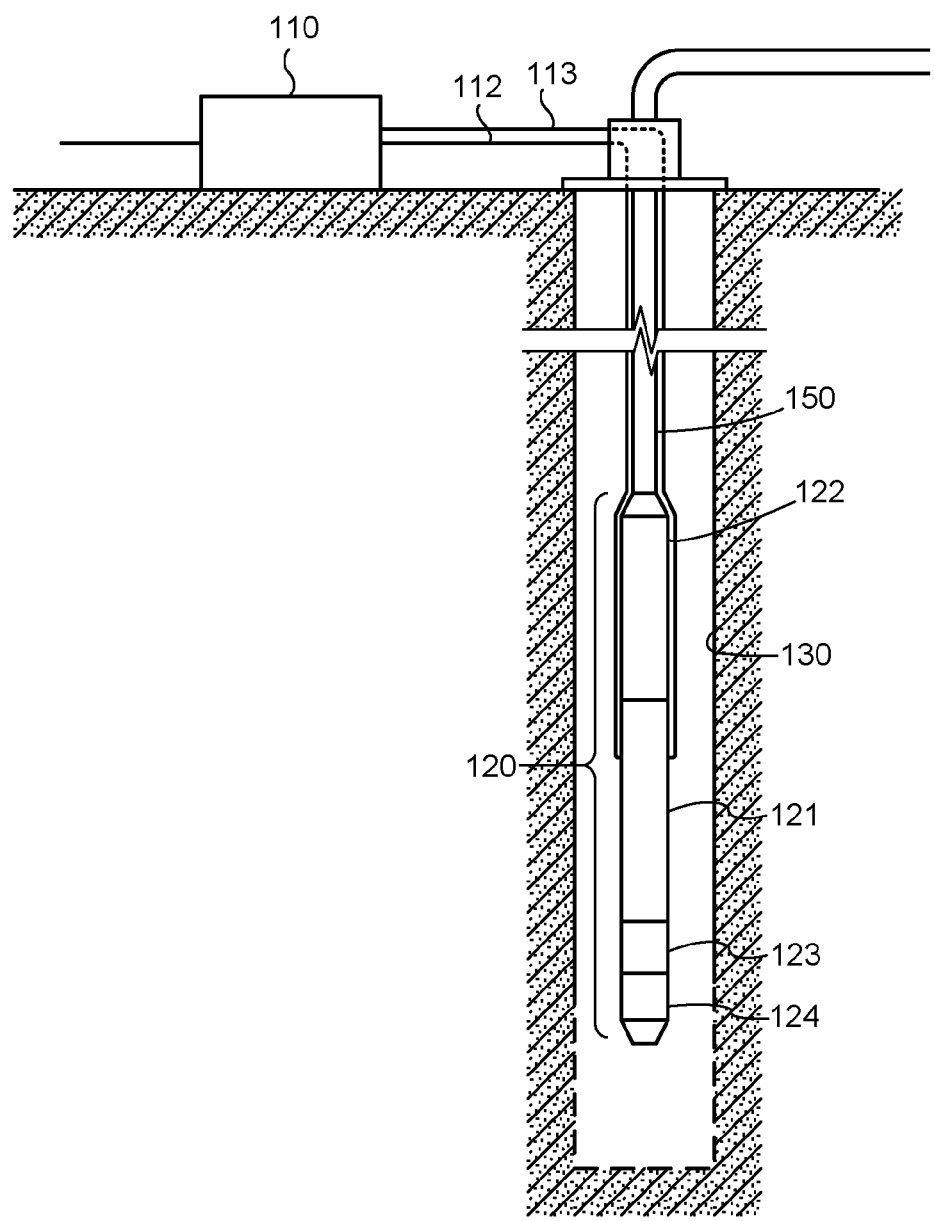
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for determining when the mover of a linear motor reaches the end of a stroke. In one embodiment, the linear motor is a component of an ESP. The linear motor receives input power from a drive system and drives a pump to lift oil out of a well in which the ESP is installed. Hall sensors are installed in the motor to sense movement of the mover within the stator. The drive system includes a controller that monitors signals from the Hall sensors, as well as several other parameters associated with the motor, and uses this information in an initialization routine to determine when the mover has reached the end of a stroke (an end stop). When the end stop is identified, the controller reverses the phase order of the power provided to the motor and drives the mover in the opposite direction.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump system 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear electric motor. Control system 110 receives AC (alternating current) input power from an external source such as a generator (not shown in the figure), rectifies the AC input power and then converts the DC (direct current) power to produce three-phase AC output power which is suitable to drive the linear motor. The output power generated by control system 110 is dependent in part upon the position of the mover within the stator of the linear motor. Position sensors in the motor sense the position of the mover and communicate this information via electrical lines 113 to control system 110 so that the mover will be driven in the proper direction (as will be discussed in more detail below). The output power generated by control system 110 is provided to pump system 120 via power cable 112.

Figure 2:
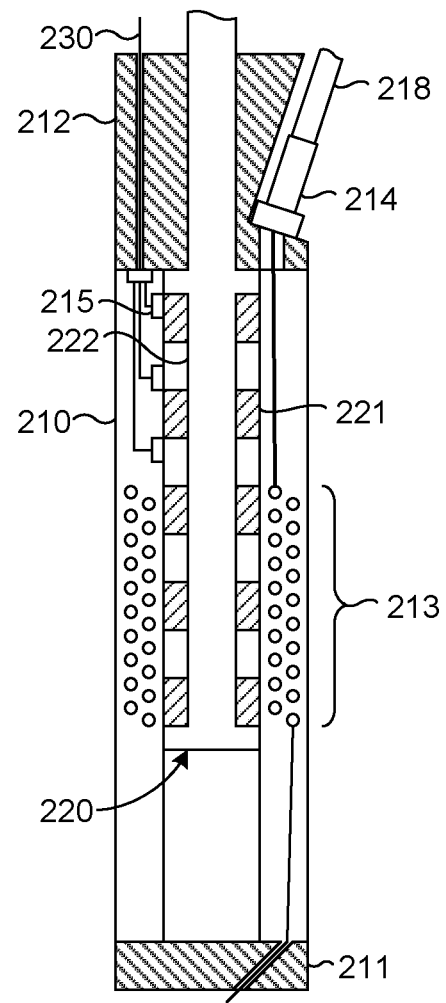
FIG. 2 is a diagram illustrating an exemplary linear motor in accordance with one embodiment which would be suitable for use in the pump system of FIG. 1.

Referring to FIG. 2, a diagram illustrating an exemplary linear motor which would be suitable for use in the pump system of FIG. 1 is shown. The linear motor has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump. In this embodiment, the pump is configured to draw fluid into the pump on the upstroke and expel the fluid on the downstroke. In other words, the downstroke is the power stroke and the upstroke is the return stroke.

Stator 210 has a set of windings 213 of magnet wire. Windings 213 include multiple separate coils of wire, forming multiple poles within the stator. The ends of the windings are coupled (e.g., via a pothead connector 214) to the conductors of the power cable 218. Although the power cable has separate conductors that carry the three phase power to the motor, the conductors are not depicted separately in the figure for purposes of simplicity and clarity. Similarly, the coils of magnet wire are not separately depicted. The coils may have various different configurations, but are collectively represented as component 213 in the figure.

The windings are alternately energized by the signals received through the power cable to generate magnetic fields within the stator. These magnetic fields interact with permanent magnets 221 on the shaft 222 of mover 220, causing mover 220 to move up and down within the motor. The waveform of the signal provided by the drive via the power cable (in this case a three-phase signal) is controlled to drive mover 220 in a reciprocating motion within the bore of stator 210. Stator 210 incorporates a set of Hall-effect sensors 215 to monitor the position of mover 220 within stator 210. The outputs of Hall-effect sensors 215 are transmitted to the controller in this embodiment via signal line 230. They may be transmitted as distinct signals, or they may be combined to form one or more composite signals. In one embodiment, the composite signal indicates transitions in the signals produced by the Hall-effect sensors, but it does not indicate which specific sensor is associated with each transition, thus failing to provide absolute position of the mover. The mover may also be coupled to an absolute encoder of some type, and data from this encoder may be transmitted to the controller. The controller then tracks the motor position based on the received signals.

Figure 3:
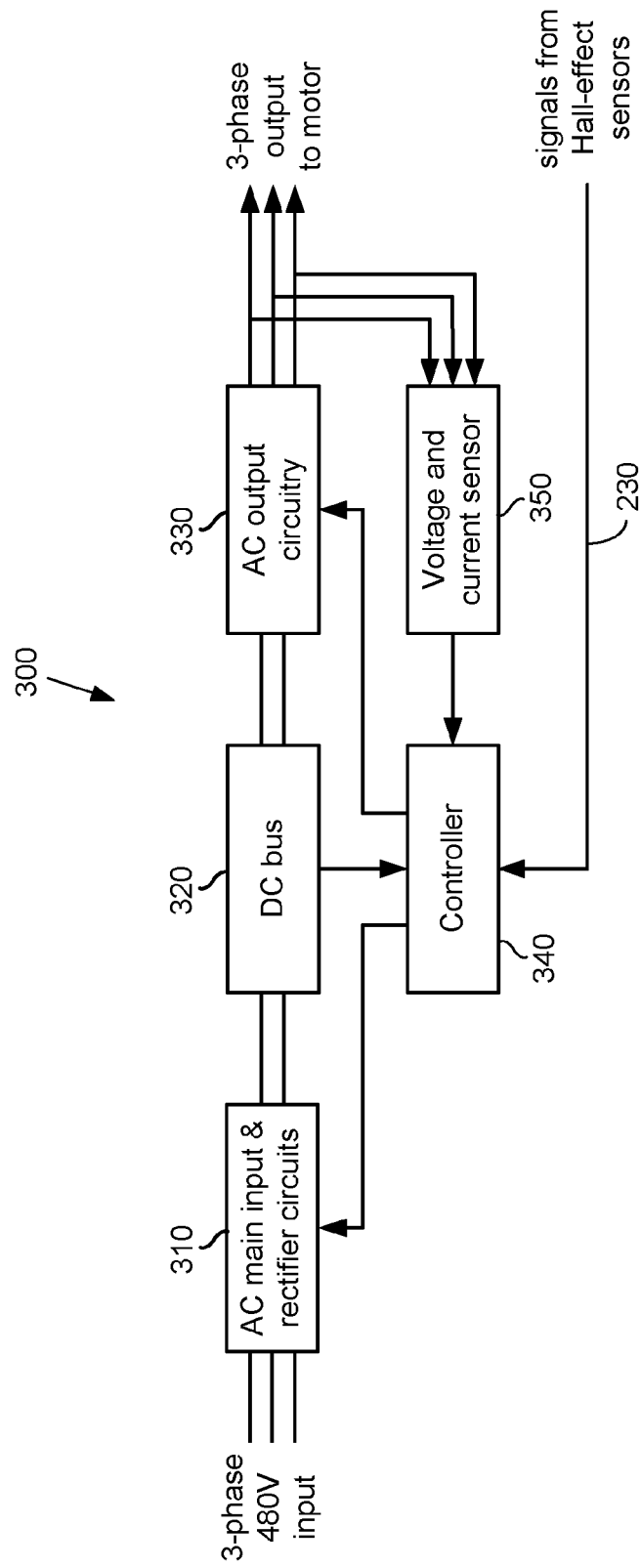
FIG. 3 is a functional block diagram illustrating the structure of a control system for a linear motor in accordance with one embodiment.

Referring to FIG. 3, a functional block diagram illustrating the structure of an exemplary control system for a linear motor in one embodiment is shown. The control system is incorporated into a drive system (e.g., 110) for the linear motor. The drive system receives AC input power from an external source and generates three-phase output power that is provided to the linear motor to run the motor. The drive system also receives position information from the linear motor and uses this information when generating the three-phase output power for the motor. It should be noted that the system of FIG. 3 is exemplary, and alternative embodiments may employ other components or technologies to produce an output signal to drive the linear motor.

As depicted in FIG. 3, drive system 300 has input and rectifier circuitry 310 that receives AC input power from the external power source. Circuitry 310 converts the received AC power to DC power at a predetermined voltage level and stores this power within the DC bus/Capacitor 320. The DC bus in this embodiment then provides DC power to the output circuitry 330 that includes a set of IGBT (insulated gate bipolar transistor) switches. The switches of output circuitry 330 are controlled by motor controller 340 to produce an AC output signal, such as a six-step or PWM waveform. Output circuitry 330 may include filters to modify the generated waveform before it is provided to the motor. For instance, it may be necessary to perform filtering on a PWM waveform in order to prevent damage to the power cable or motor. The signal produced by output circuitry 330 is transmitted to the downhole linear motor via a power cable. As noted above, this system is exemplary, and alternative embodiments may use other technologies (e.g., a matrix converter) to generate the desired output signal from the AC input power.

The power produced by output circuitry 330 is monitored by voltage and current sensors 350. Sensors 350 provide signals to motor controller 340 indicating the voltage output by output circuitry 330, and the current drawn by the downhole linear motor. Motor controller 340 also receives position information from the downhole linear motor. In one embodiment, this position information consists of the signals generated by the Hall-effect sensors as described above in connection with FIG. 2. Motor controller 340 can use the received position information to determine the position and speed of the mover within the linear motor, as will be discussed in more detail below. Based upon the position and speed of the mover, as well as various other information, controller 340 controls output circuitry 330 to generate an output signal to drive the motor.

The downhole linear motor is an electrically commutated motor. In other words, the electrical commutation or voltage modulation is accomplished electrically via the surface drive unit. In normal operation (while the system is operating to pump fluid from the well), the motor is electrically commutated based on the position of the mover. More specifically, in this embodiment, the motor is commutated based on the Hall signals. The output signals produced by the drive system are generated to slightly lead the mover, regardless of the mover's speed, rather than being generated at a specific frequency. The speed of the motor is controlled by varying the voltage of the drive signal provided to the motor, and not by directly controlling the frequency of the drive signal. Due to continuous monitoring of the DC Bus voltage and a controlled drive output signal relative to the mover's position, this scheme does not normally result in the unchecked increase of the motor's speed.

As noted above, it is desirable to know the position of the mover within the motor, as well as the speed and direction of the mover. For instance, if it is known that the mover is in the middle of the power stroke (downward in one embodiment), the controller can generate an output with the proper phasing to drive the mover through the rest of the stroke. (While it may be possible to drive the motor with an output that does not have the desired phasing, the motor generally does not operate as efficiently as when the proper phasing is used). Improper phasing may also result in increased power losses and a significant drop in the overall system efficiency. At the end of the stroke, the controller reverses the phasing of the power to the motor and thereby drives the mover in the opposite direction.

Prior to operating the motor, it is typically necessary to perform an initialization routine or a homing routine to place the motor in a known state or position, or to determine the output power phasing that is associated with the motor's power and return strokes. Similar routines may be performed when the pump loses its prime, or when various other conditions cause interruptions of the normal operation of the system. These routines involve determining when the mover has reached a hard stop or end stop of the power or return stroke. For example, during an initialization routine, the controller may generate an output that causes the mover to move in one direction until the end of the stroke in that direction is reached. Then, knowing that the mover is at the end of the stroke, the number of Hall transitions counted during that move/stroke can be verified with the predetermined number of Hall transitions (calculated based on several factors such as the stroke length, magnetic pole pitch, etc.), to determine the position of the mover within that stroke. When the end of this stroke is reached, the phase order of the power output to the motor can be reversed to drive the mover in the opposite direction.

Figure 4:
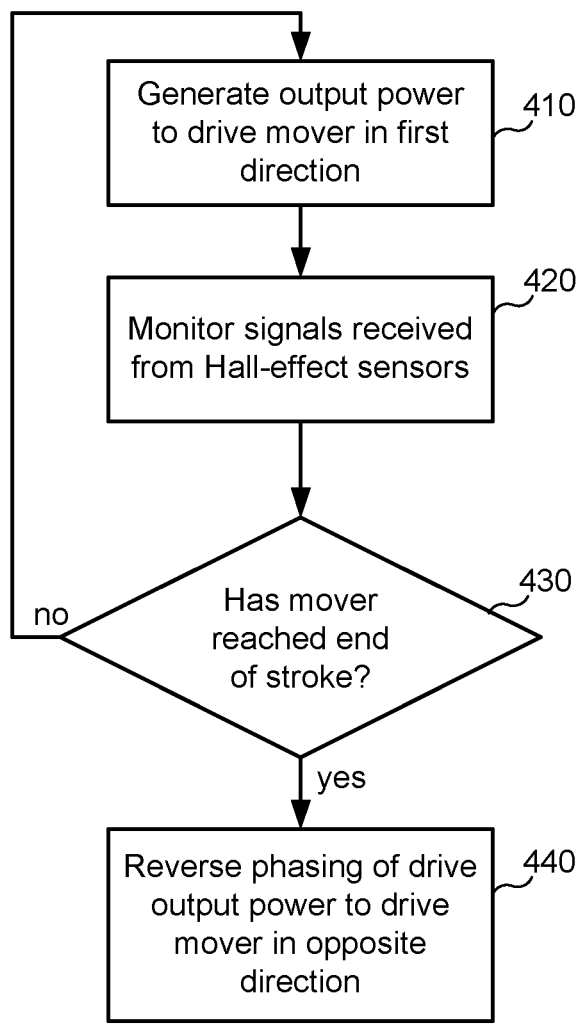
FIG. 4 is a flow diagram illustrating a method for identifying end stops in a linear motor in accordance with one embodiment.

An exemplary initialization routine is illustrated in the flow diagram of FIG. 4. In this embodiment, the controller causes the drive system to generate a power output that drives the motor's mover in a first direction (410). The signal from the Hall sensors is monitored to identify transitions in the signal (420). As explained above, these transitions indicate movement of the mover past the Hall sensors in the stator. The controller then determines from the identified Hall transitions whether the mover has reached the end of the stroke (430). This determination may be made in various ways. For example, if the power output to the motor should drive the motor at a particular frequency (cycles per second), then the transitions of the Hall signals should also occur with a known frequency (Hall transitions per second). If a predetermined number of Hall transitions that are expected to occur with this frequency are reached, then it is assumed that the mover is at the end of the stroke. When the mover has reached the end of the stroke, the phasing of the power output to the motor is reversed to drive the mover in the opposite direction (440). Otherwise, the controller causes the drive system to continue to drive the mover in the current direction (410).

It should be noted that the controller may determine whether the mover has reached the end of the stroke in various different ways, and the specific manner in which the determination is made may depend upon factors such as the particular conditions that exist. For instance, the hard stop determination may be made based upon the timing between successive Hall transitions, an elapsed time since the last Hall transition, a number of Hall transitions that have been detected in a stroke, and so on.

Figure 5A:
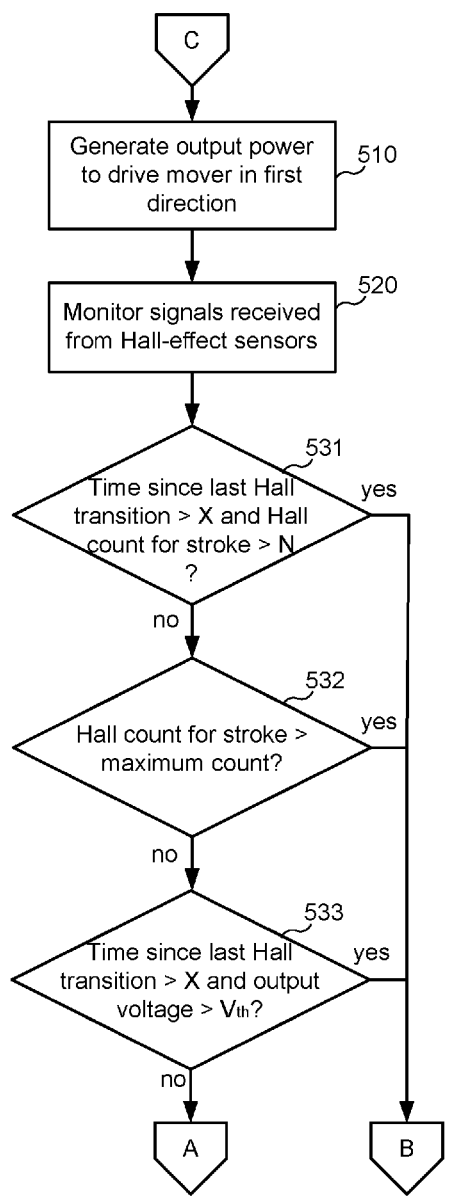
FIGS. 5A and 5B are flow diagrams illustrating a method using multiple conditions for identifying end stops in a linear motor in one embodiment.
Figure 5B:
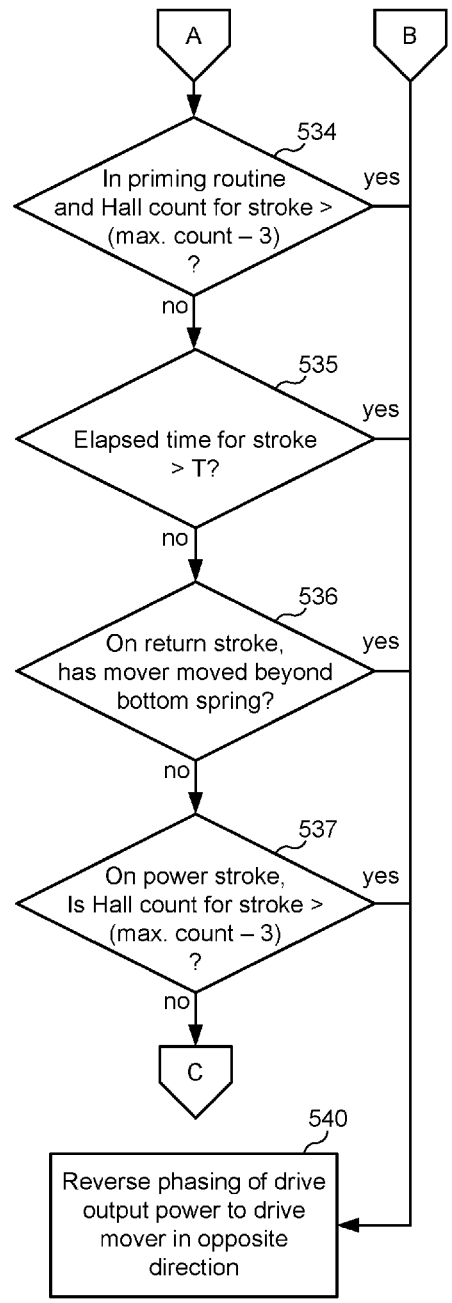

Referring to FIGS. 5A and 5B, flow diagrams are shown to illustrate a method that uses multiple test conditions to determine whether or not the mover of a downhole linear motor for an ESP has reached either end stop. Initially, power is provided to the motor with a first phase order that drives the mover in a first direction (510). The signal from the Hall sensors is monitored and fed back to the controller (520). As the controller detects the Hall transitions, it maintains various timing parameters, including the time differentials between transitions, the elapsed time since the last transition, and the elapsed time for the entire stroke. The controller also maintains the number of Hall transitions it detects within the stroke, the drive's output voltage, whether the stroke is a power stroke or return stroke, instantaneous over speed check, and whether the pump is being primed.

As the drive provides power to the motor (which generally will advance the mover through a stroke), the controller continually checks a set of tests that indicate whether the mover is at an end stop. In the first test (531) in this example, the controller first determines whether it has detected at least a minimum number (N) of Hall transitions for the current stroke. Having detected this minimum number of Hall transitions, the controller can assume that the mover has been moving through the stroke. The controller then determines whether at least a minimum amount of time (X) has elapsed since the last Hall transition. If the elapsed time is less than this amount (X), the mover may still be advancing through the stroke. If the elapsed time is greater than X, the mover is moving slower than expected since X is calculated based on the set/demanded speed. The minimum time may, for example, be equal to 4-6 times the expected time differential between Hall transitions, so that a delay greater than this amount can be assumed to be the result of the mover having stopped.

In the second test (532), the controller determines whether the number of Hall transitions detected during the current stroke has reached the maximum number of transitions that can occur during a single stroke. For example, if the mover, in traveling from one end of its stroke to the other, can generate a maximum of 100 Hall transitions, then when the controller detects the $100^{th}$ transition, it can assume that the mover has reached the end of its stroke.

In the third test (533), the controller determines whether conditions associated with the priming of the pump exist. For example, one of the conditions is that the output voltage of the drive be above a threshold voltage ($V_{th}$) which is the minimum voltage required to move the mover. The controller also determines whether at least a minimum amount of time (X) has elapsed since the last Hall transition occurred. If the elapsed time is greater than X, the mover is not moving as quickly as expected, so it is assumed that the mover has reached an end stop. The minimum amount of time (X) may be the same as in the case of the first test (531), or it may be different.

In the fourth test (534), the controller again determines whether conditions associated with the priming of the pump exist. In this case, the controller is aware that the pump is being primed. If, during the priming procedures, the controller detects a number of Hall transitions that is three less than the maximum possible number of transitions, it is assumed that the mover has reached (or nearly reached) an end stop. Detecting this reduced number of Hall transitions (the maximum possible number in a stroke, minus three) effectively causes the controller to identify the end stop as having been reached slightly before the actual end of the stroke. This may be desirable to avoid having the mover driven into a hard stop with more force (if a higher priming frequency and voltage are provided to the motor during priming procedures) than during normal operation.

In the fifth test (535), the controller determines whether the time that has elapsed since the beginning of a stroke exceeds a predetermined amount of time. In this instance, the number of Hall transitions and the timing of the transitions do not come into play. The predetermined amount of time may vary depending upon the expected speed of the mover, various other factors, or it may be set by the user. For instance, if the motor is being driven at a frequency F, the predetermined amount of time may be T, but if the motor is being driven at a frequency ½ F, the predetermined amount of time may be 2T. The predetermined amount of time to which the elapsed time is compared may be the same for both the power stroke and the return stroke, or it may be different for the power stroke than it is for the return stroke.

In the sixth test (536), the controller determines whether the mover is moving in the return stroke direction, and whether the mover has moved beyond a bottom spring that is positioned in the motor. "Beyond", as used here, refers to movement of the mover beyond the point at which the mover contacts the spring. If both of these conditions are true, the controller determines that the mover has reached the end of the return stroke.

In the seventh test (537), the controller again determines whether the mover is moving in the power stroke direction, and then determines whether the number of Hall transitions detected for the power stroke have reached a number that is three less than the maximum possible number of transitions. If so, it is assumed that the mover has reached (or nearly reached) an end stop. Detecting the reduced number of Hall transitions (the maximum possible transitions for the stroke minus three) causes the controller to identify the end stop as having been reached slightly before the actual end of the stroke. This may be desirable to avoid the mover hitting a hard stop with a large force at higher back pressures, avoiding potential damage to the motor itself.

It should be noted that the tests of steps 531-537 need not be performed in a particular order. Further, alternative embodiments may use fewer of these tests, more of the tests, or different types of tests to determine when the end of a stroke in the linear motor has been reached. As noted above, alternative embodiments may use different threshold time values when comparing to the elapsed time values in the tests. Alternative embodiments may also use different values for the threshold numbers of Hall transitions to which the Hall counts are compared.

If none of the tests in steps 531-537 determines that the end of a stroke has been reached, the controller continues to produce an output to drive the motor in the current direction (i.e., with the correct phase order) (510). If any one of the tests of steps 531-537 determines that the end of a stroke has been reached, the controller causes the drive to produce an output with the opposite phase order, which drives the motor in the opposite direction (540). After the direction of the mover has been reversed, the controller may continue with this procedure (continuing to test for end stop in the current stroke) if the initialization or priming procedure has not completed, or it may end the procedure and begin normal operation of the motor.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for controlling a linear motor of an electric submersible pump (ESP) system wherein the motor runs on multiphase power, the method comprising:
    providing power to a linear motor of an ESP system, wherein the power is provided with voltages that have a first phase order that drives a mover of the motor in a first direction within a bore of a stator in the motor;
    monitoring a set of position sensors in the stator, wherein the position sensors produce corresponding output signals and wherein transitions in the output signals indicate changes in a position of the mover;
    determining time differentials between successive ones of transitions in the output signals;
    maintaining a count of the transitions in the output signals;
    when the time differential between a last pair of successive transitions in the output signals exceeds a threshold time differential and the count of the transitions in the output signals is at least a minimum, reversing the power provided to the linear motor of the ESP system by providing power which is provided with voltages that have a second phase order which is opposite the first phase order.

2. The method of claim 1, further comprising determining whether the count of the transitions in the output signals exceeds a maximum count threshold and, when the count of the transitions in the output signals exceeds the maximum count threshold, reversing the power provided to the linear motor of the ESP system by providing power having a second phase order which is opposite the first phase order.

3. The method of claim 1, further comprising determining whether an output voltage of the power provided to the linear motor of the ESP system exceeds a threshold voltage and, when the output voltage exceeds the threshold voltage, reversing the power provided to the linear motor of the ESP system by providing power having a second phase order which is opposite the first phase order.

4. The method of claim 1, further comprising: determining whether the linear motor of the ESP system is executing a priming routine; determining whether the count of the transitions in the output signals is within a predetermined range of a maximum count threshold; and, when the linear motor of the ESP system is executing the priming routine and the count of the transitions in the output signals is within the predetermined range of the maximum count threshold, reversing the power provided to the linear motor of the ESP system by providing power having a second phase order which is opposite the first phase order.

5. The method of claim 1, further maintaining an elapsed time for a stroke of the linear motor of the ESP system and when the elapsed time for the stroke of the linear motor of the ESP system exceeds a threshold elapsed time, reversing the power provided to the linear motor of the ESP system by providing power having a second phase order which is opposite the first phase order.

6. The method of claim 1, further comprising: determining whether the linear motor of the ESP system is performing a return stroke; when the linear motor of the ESP system is performing a return stroke, determining whether a mover of the linear motor of the ESP system has moved beyond a bottom spring that is positioned in the linear motor; and when the mover of the linear motor of the ESP system has moved beyond the bottom spring, reversing the power provided to the linear motor of the ESP system by providing power having a second phase order which is opposite the first phase order.

7. The method of claim 1, further comprising: determining whether the linear motor of the ESP system is performing a power stroke; when the linear motor of the ESP system is performing a power stroke, determining whether the count of the transitions in the output signals is within a predetermined range of a maximum count threshold; and, when the linear motor of the ESP system is performing the power stroke and the count of the transitions in the output signals is within the predetermined range of the maximum count threshold, reversing the power provided to the linear motor of the ESP system by providing power having a second phase order which is opposite the first phase order.

8. An apparatus comprising:
    an electric drive configured to produce multiphase output power, wherein the output power is initially provided with voltages that have a first phase order;
    wherein the electric drive includes a controller that receives motor position signals;
    wherein the controller monitors the position signals, determines time differentials between successive ones of transitions in the position signals, and maintains a count of the transitions in the position signals;
    wherein when the time differential between a last pair of successive transitions in the output signals exceeds a threshold time differential and the count of the transitions in the output signals is at least a minimum count, the controller reverses the power provided to the linear motor of the ESP system by providing power which is provided with voltages that have a second phase order which is opposite the first phase order.

9. The apparatus of claim 8:
    wherein the apparatus comprises an electric submersible pump system having a linear motor;
    wherein the linear motor is coupled to the electric drive by a power cable;
    wherein the linear motor is coupled to drive a reciprocating pump;
    wherein the linear motor has a stator and a mover;
    wherein the mover is positioned within a bore of the stator;

wherein the mover moves in a reciprocating motion within the bore between a first end of a stroke and a second end of the stroke;

wherein the linear motor has a set of position sensors in the stator wherein the position sensors are positioned next to the bore;

wherein the position sensors produce corresponding ones of the position signals, thereby indicating changes in a position of the mover.

10. The apparatus of claim 8, wherein the controller further determines whether the count of the transitions in the output signals exceeds a maximum count threshold and, when the count of the transitions in the output signals exceeds the maximum count threshold, the controller reverses the power provided to the linear motor of the ESP system by providing power which is provided with voltages that have the second phase order which is opposite the first phase order.

11. The apparatus of claim 8, wherein the controller further determines whether an output voltage of the power provided to the linear motor of the ESP system exceeds a threshold voltage and, when the output voltage exceeds the threshold voltage, the controller reverses the power provided to the linear motor of the ESP system by providing power which is provided with voltages that have the second phase order which is opposite the first phase order.

12. The apparatus of claim 8, wherein the controller further determines whether the linear motor of the ESP system is executing a priming routine; wherein the controller further determines whether the count of the transitions in the output signals is within a predetermined range of a maximum count threshold; and, wherein when the linear motor of the ESP system is executing the priming routine and the count of the transitions in the output signals is within the predetermined range of the maximum count threshold, the controller reverses the power provided to the linear motor of the ESP system by providing power which is provided with voltages that have the second phase order which is opposite the first phase order.

13. The apparatus of claim 8, wherein the controller further maintains an elapsed time for a stroke of the linear motor of the ESP system and wherein when the elapsed time for the stroke of the linear motor of the ESP system exceeds a threshold elapsed time, the controller reverses the power provided to the linear motor of the ESP system by providing power which is provided with voltages that have the second phase order which is opposite the first phase order.

14. The apparatus of claim 8, wherein the controller further determines whether the linear motor of the ESP system is performing a return stroke; wherein when the linear motor of the ESP system is performing a return stroke, the controller determines whether a mover of the linear motor of the ESP system has moved beyond a bottom spring that is positioned in the linear motor; and wherein when the mover of the linear motor of the ESP system has moved beyond the bottom spring, the controller reverses the power provided to the linear motor of the ESP system by providing power which is provided with voltages that have the second phase order which is opposite the first phase order.

15. The apparatus of claim 8, wherein the controller further determines whether the linear motor of the ESP system is performing a power stroke; wherein when the linear motor of the ESP system is performing a power stroke, the controller determines whether the count of the transitions in the output signals is within a predetermined range of a maximum count threshold; and, wherein when the linear motor of the ESP system is performing the power stroke and the count of the transitions in the output signals is within the predetermined range of the maximum count threshold, the controller reverses the power provided to the linear motor of the ESP system by providing power which is provided with voltages that have the second phase order which is opposite the first phase order.

16. The apparatus of claim 8, wherein the electric drive is configured to:

provide power to a linear motor of an ESP system, wherein the power is provided with voltages that have first phase order that drives a mover of the motor in a first direction within a bore of a stator in the motor;

monitor a set of position sensors in the stator, wherein the position sensors produce corresponding output signals that are received by the controller as the position signals, and wherein transitions in the output signals indicate changes in a position of the mover.

\* \* \* \* \*